Sept. 9, 1952     N. M. REINERS     2,610,098
PISTON CONSTRUCTION
Filed April 25, 1950

INVENTOR.
Neville M. Reiners,
BY
Davis, Lindsey, Hibben + Noyes
Atty's

Patented Sept. 9, 1952

2,610,098

UNITED STATES PATENT OFFICE 2,610,098

PISTON CONSTRUCTION

Neville M. Reiners, Columbus, Ind., assignor to Cummins Engine Company, Inc., Columbus, Ind., a corporation of Indiana Application April 25, 1950, Serial No. 157,895

5 Claims. (Cl. 309—31)

The invention relates generally to piston constructions and more particularly to pistons for internal combustion engines.

The general object of the invention is to provide a novel piston construction by which the rings carried by the piston are rapidly brought into conformance with the walls of the cylinder in which the piston operates so that rings will function as an effective seal against combustion pressure and will provide a high degree of heat conductivity from the piston to the cylinder wall.

Another important object is to provide a novel piston construction producing a relatively rapid "run-in" of new piston rings, whether they are new rings in a new engine or new rings in a reconditioned engine.

A further object is to provide a novel piston construction, by which the rings carried thereby are rapidly run in, and with which the rings operate in the normal and usual manner after such run-in occurs.

Other objects and advantages will become apparent from the following description taken in connection with the accompanying drawings, in which.

Figure 1:
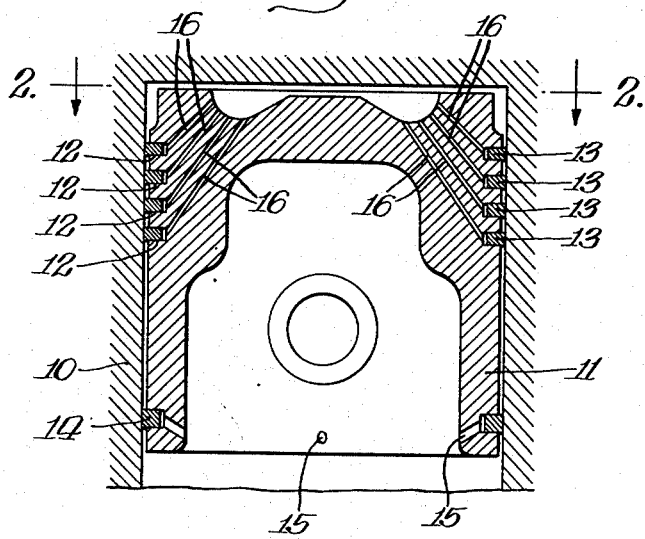
Figure 1 is an axial sectional view of a piston construction embodying the features of the invention and showing it in position in its cylinder.
Figure 2:
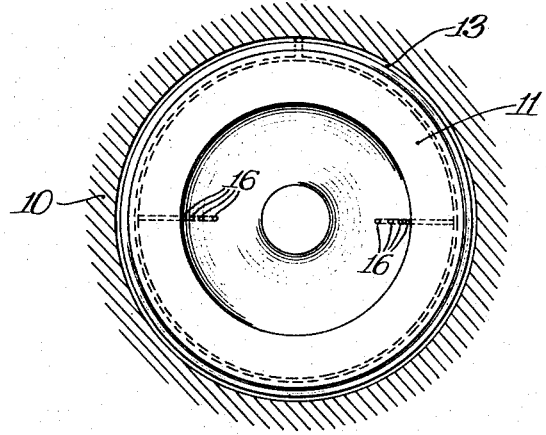
Fig. 2 is a sectional view taken on the line 2—2 of Fig. 1.

When an internal combustion engine is first completely assembled and is ready for operation, or when such an engine has been reconditioned, various parts of the engine require a run-in period during which such parts undergo slight wear to cause them to conform to associated parts and thereby function in their intended manner. Such run-in is required wherever there are two parts in contact, between which there is relative movement. One important instance of this is in the case of piston rings carried in grooves in each piston and engaging the wall of the associated cylinder. A piston ring, when first installed, rarely has a sufficiently conforming fit in the cylinder to provide the desired seal against compression pressures nor does it contact the cylinder with sufficient intimacy to provide good heat conductivity. Compression is thereby lost and the piston and rings tend to run hot. However, after run-in, the rings closely conform to the cylinder wall and an effective seal is thereby provided. The heat conductivity is also improved so that heat from the piston is transmitted to the cylinder wall and is there dissipated to the cooling medium.

Where a piston is provided with a plurality of compression rings, the uppermost ring of the set is subjected to the highest pressures and the greatest heat. Such ring tends to run-in first, before the lower rings have completed their run-in, and thus is subjected to the greatest load. It would, of course, be more desirable to have all rings run in with equal rapidity but under normal conditions this does not occur. Because of the heavier load on the uppermost ring, some engine manufacturers have provided a chrome-plated ring at the top position with the lower rings of the normal cast iron type. This has been found to give good performance from the standpoint of providing equal length of service of all of the rings. But the chrome-plated ring wears in more slowly than the usual cast iron type so that an engine equipped in this manner may require a relatively long period of run-in.

The present invention provides for relatively rapid run-in of all of the rings, whether they all are of the cast-iron type or whether a chrome-plate plated ring is used in the top groove. Broadly this is accomplished by providing an outward expanding force on the rings in addition to their inherent resilient expansion, so as to cause relatively rapid wear to the point of conforming to the cylinder wall. Such force is exerted during the initial period of operation of the engine, but the structure is such that by the time the run-in of the rings is completed, the additional force thus provided is no longer exerted and the rings thereafter function in a normal manner.

The additional force is provided by admitting compression pressures to the inner portion of the ring grooves so as to force the rings outwardly. The arrangement may be such that all rings are subjected to such expanding pressures or only that ring (or rings) of the set, that is normally the slowest to complete its run-in. To subject a ring to the compression pressure, a passage is provided which leads from an external surface of the piston exposed to such pressure to the inner portion of the groove, and the passage is so dimensioned that it will fill up with carbon during the run-in period and thus will become closed by the time the rings have run in. The rings, therefore, will thereafter function in the usual manner without the additional expanding force.

In the drawing there is shown one form of construction by which the foregoing results may be obtained. Thus, in these figures, the cylinder is shown at 10 and the piston at 11. The latter is illustrated as having a plurality of peripheral grooves 12 to receive a corresponding number of compression rings 13. The grooves 12, as is customary, are of sufficient depth to provide a space in the inner portion of each groove between the inner periphery of the ring and the back of the groove when the ring engages the cylinder wall. In the normal arrangement, there is a few thousandths of an inch clearance between the periphery of the piston and the cylinder wall, and the rings project outwardly beyond the piston into engagement with the cylinder to provide a seal therewith to maintain suitable compression pressures in the combustion chamber portion of the cylinder. The engagement of the rings with the cylinder wall also serves to conduct heat from the piston to the cylinder wall for dissipation by whatever cooling medium is utilized in the engine. The piston 11 is also provided with an oil ring 14 located below the compression rings and adapted to scrape oil from the cylinder wall as the piston reciprocates. The groove in which the oil ring 14 is positioned is usually provided with one or more passages 15 leading from the inner portion of the groove to drain any oil collecting in the groove back to the crankcase.

Since the rings 13 may take a substantial length of time to complete their run-in if expanded under normal conditions and since the respective rings of the set of four illustrated may require different lengths of time to complete their run-in, an additional expanding force is exerted on at least one of the rings of the set or if desired on all of the compression rings. The additional expanding force is, in this instance, the compression pressure which is here illustrated as being admitted to the inner portions of all of the grooves 12. In the form shown in these two figures, the compression pressure is conducted to the grooves 12 by a plurality of passages or small bores 16 leading, in the present instance, from the head or upper end of the piston to the back of the grooves and opening therein. Since the head or upper end of the piston is subjected to compression pressure, such pressure will be transmitted to the grooves and will force the rings outwardly to effect a rapid run-in of all of the rings. While one set of bores 16 in some instances may be sufficient, two such sets are shown in the drawing.

After the rings have worn sufficiently to adequately conform to the cylinder wall, transmittal of compression pressure to the grooves is thereafter prevented. To accomplish this, the passages 16 are dimensioned so that they will clog with carbon during the initial period of operation while the rings are being run in. In one make of the engine, this clogging was found to occur in the proper period of time when the passage 16 was made $\frac{1}{32}$ of an inch in diameter. The exact size will, of course, differ for different engines, since the formation of carbon will depend on a number of factors including the length of the passage, the conformation of the piston, and the operating temperatures of the piston, but for most engines it may be said that the carbon formation will close the passage in the desired time, if the passage has a diameter on the order of $\frac{1}{32}$ of an inch.

With an arrangement of the foregoing character, each ring which is expanded by the application of compression pressure to the inside thereof will rapidly run in and thereafter conform closely to the shape of the cylinder wall. An effective seal is thereby quickly attained in the initial period of operation and thereafter suitable conduction of heat from the piston to the cylinder wall occurs.

I claim:

1. A piston member for a cylinder of an internal combustion engine, said piston member having a peripheral groove, and a compression ring member mounted in said groove, one of said members having a passageway positioned to provide communication between the compression space of the cylinder and the inner portion of said groove to subject said inner portion to compression pressure and thereby force the ring member outwardly into conformance with the cylinder, said passageway being so dimensioned and positioned that it will clog with carbon after a predetermined length of time of operation of the engine and thereby shut off said communication, the groove remaining substantially free of carbon so that the ring may freely expand and contract.

2. A piston member for a cylinder of an internal combustion engine, said piston member having a peripheral groove, and a compression ring member mounted in said groove, one of said members having a passageway extending from an external surface of the piston member which is subjected to compression pressures to the inner portion of said groove inwardly of said ring member to conduct compression pressure to said inner portion and thereby provide a force acting outwardly on the ring member and tending to cause the latter to conform to the shape of the cylinder whereby the ring member will rapidly wear to the shape of the cylinder to provide an effective seal and heat conductivity the passageway being dimensioned to readily fill up with carbon, while the groove remains substantially free of carbon, to prevent conduction of compression pressures to the inner portion of the groove after a predetermined amount of wear of the ring member has occurred so that the ring thereafter expands and contracts in a normal manner.

3. A piston for a cylinder of an internal combustion engine, said piston having a plurality of axially spaced ring grooves, and a plurality of rings mounted in the respective grooves, said piston having at least one passageway leading from an external surface of the piston exposed to compression pressure to the inner portion of one of said grooves to subject the ring in said one groove to compression pressure at its inner periphery to froce the ring outwardly and thereby effect rapid run-in of said ring during the initial period of operation of the engine, the cross-sectional dimensions of said passageway being such that it fills with carbon during said initial period and the passageway thereby becomes closed substantially at the time the run-in of said ring is completed with the groove remaining substantially free of carbon so that the ring is free to expand and contract.

4. A piston for a cylinder of an internal combustion engine, said piston having a peripheral groove adapted to receive a piston ring and having a passage extending from the end face of the piston at the compression end thereof to the inner portion of said groove whereby the ring will be subjected to compression pressure at its inner periphery to force the ring outwardly and thereby effect rapid run-in of said ring during the initial period of operation of the engine, the cross-sectional dimensions of said passage being such that it fills with carbon during said initial period with the groove remaining substantially free of carbon and the passage thereby becomes closed substantially at the time run-in of said ring is completed and the ring is thereafter free to expand and contract in the groove.

5. A piston for a cylinder of an internal combustion engine, said piston having a peripheral groove adapted to receive a piston ring, and having a passage extending from the end face of the piston at the compression end thereof to the inner portion of said groove whereby the ring will be subjected to compression pressure at its inner periphery to force the ring outwardly and thereby effect rapid run-in of said ring during the initial period of operation of the engine, the diameter of said passage being on the order of $\frac{1}{32}$ of an inch whereby said passage will fill with carbon before any substantial formation of carbon in the groove during said initial period and the passage thereby becomes closed substantially at the time run-in of the ring is completed with the ring thereafter free to expand and contract normally in the groove.

NEVILLE M. REINERS.

REFERENCES CITED

The following references are of record in the file of this patent:

UNITED STATES PATENTS

| Number | Name | Date |
|---|---|---|
| 1,523,572 | Agard | Jan. 20, 1925 |

FOREIGN PATENTS

| Number | Country | Date |
|---|---|---|
| 454,542 | France | Apr. 29, 1912 |